Jan. 14, 1969   M. L. NATHAN   3,421,372
FLUID-FLOW METERING MEANS
Filed May 5, 1966
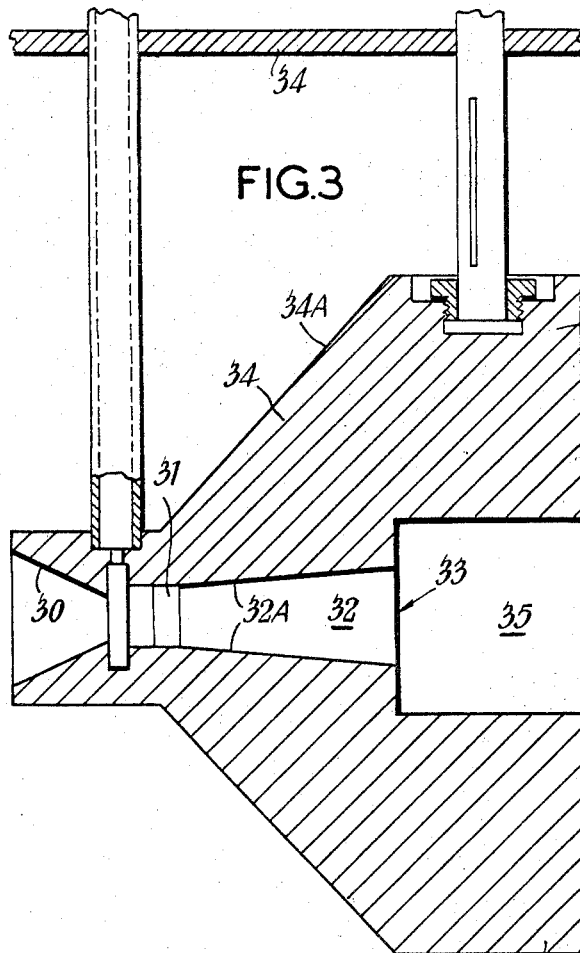
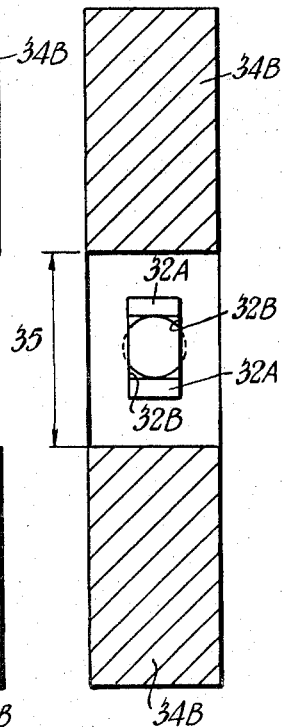
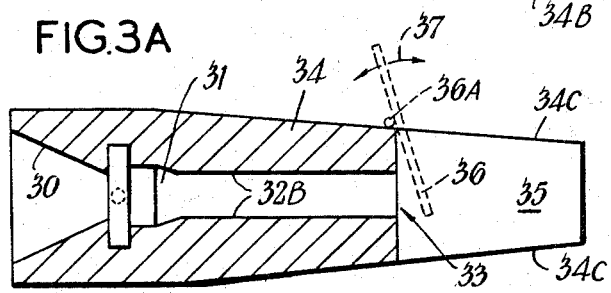
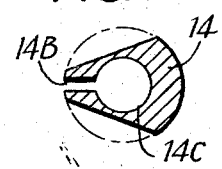
INVENTOR
MATTHEW L. NATHAN

# United States Patent Office 3,421,372
Patented Jan. 14, 1969

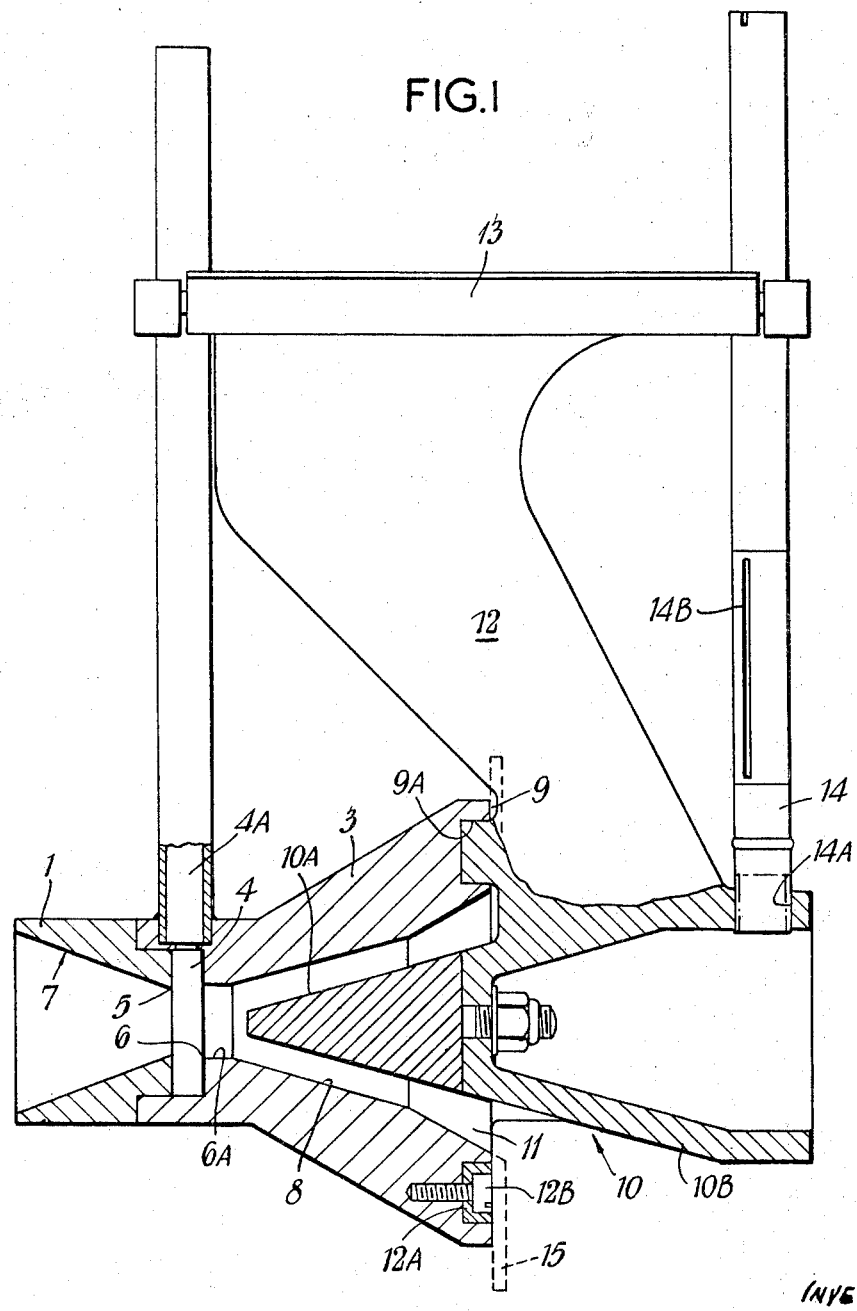

3,421,372
FLUID-FLOW METERING MEANS
Matthew L. Nathan, 10 Sterling St.,
London, SW. 7, England
Filed May 5, 1966, Ser. No. 547,848
Claims priority, application Great Britain, May 5, 1965,
18,938/65
U.S. Cl. 73—213          3 Claims
Int. Cl. G01f 1/00

ABSTRACT OF THE DISCLOSURE

A convergent-divergent bore through a flow measuring body intercepts a minor portion of the total flow of a fluid stream and flow through the bore is maximized by providing a divergent portion on the body between its inlet and outlet ends, thus to provide a maximum of measured differential pressure with a minimum of total head loss.

---

This invention relates to fluid-flow metering means, of the general kind in which convergent-divergent ducting creates a pressure differential which is related to the fluid velocity and which consequently, when in a duct, can be arranged to produce a signal or response in terms of mass flow of the fluid.

The invention aims to provide such means which will operate with minimal losses; which is not over-sensitive to roughness or irregularity in the duct wall surfaces; which has a wide operational range, and which if required may be used as a dual-range meter. It is also possible to adapt the means of the invention so that the signal or response is linear or otherwise different from the usual "square law" response. The means lends itself to light, economic, and short length construction involving simple installation in existing ducts. A main advantage sought is the provision of a meter having a constant coefficient down to low Reynolds Number. The invention can afford simple forms of adjustment. For example, adjustment may be provided whereby the device may be calibrated by adjusting the pressure differences so as to match and therefore correspond to those of a standard. Another adjustment afforded is to the effective orifice, in order to suit different fluid conditions. Yet another adjustment may be of automatic kind, and result in affording a linear response as compared to the quadratic response otherwise given. The means with which the invention is concerned is of the kind which is to be mounted coaxially within an outer duct or pipe which is preferably parallel-walled but which may in itself be of venturi-like section.

For the purposes of description the device is called a meter, it being understood that for measuring purposes it must be associated with such differential manometric devices, indicators, recorders, etc. as may be required, none of which form part of the invention.

According to the invention, means for measuring fluid flow in a duct comprises a body adapted to be mounted in the duct spaced substantially from the internal wall of the duct the body being shaped so as to define a convergent fluid passage between itself and said wall, the body being formed internally as a convergent-divergent (or Venturi) tube passage and having means for transmitting the throat pressure of fluid flowing therethrough to a suitable manometric device, the downstream divergence of the said tube passage opening into the duct downstream of the said convergent passage, and there being means for transmitting a total-head pressure in the fluid to be differentiated from said throat pressure. By "total head" is meant, a pressure which is the arithmetic sum of the ambient static pressure and dynamic pressure.

The invention further provides a conically-shaped downstream second body mounted to extend in the upstream sense into said divergence and thus to define the tube divergence as a passage of annular cross-section, the downstream body also extending in the downstream sense, beyond the downstream end of the first said body.

The invention also includes a number of particular features which either separately or togehter, result in the provision of a flowmeter of superior technical attributes; and such features are defined in the claims which are to be read in the light of the following description, assisted by reference to the accompanying drawings in which by way of example:

FIGURE 1 is a cross-section of means according to the invention indicating but not showing completely, the duct in which it is installed;

Figure 2:
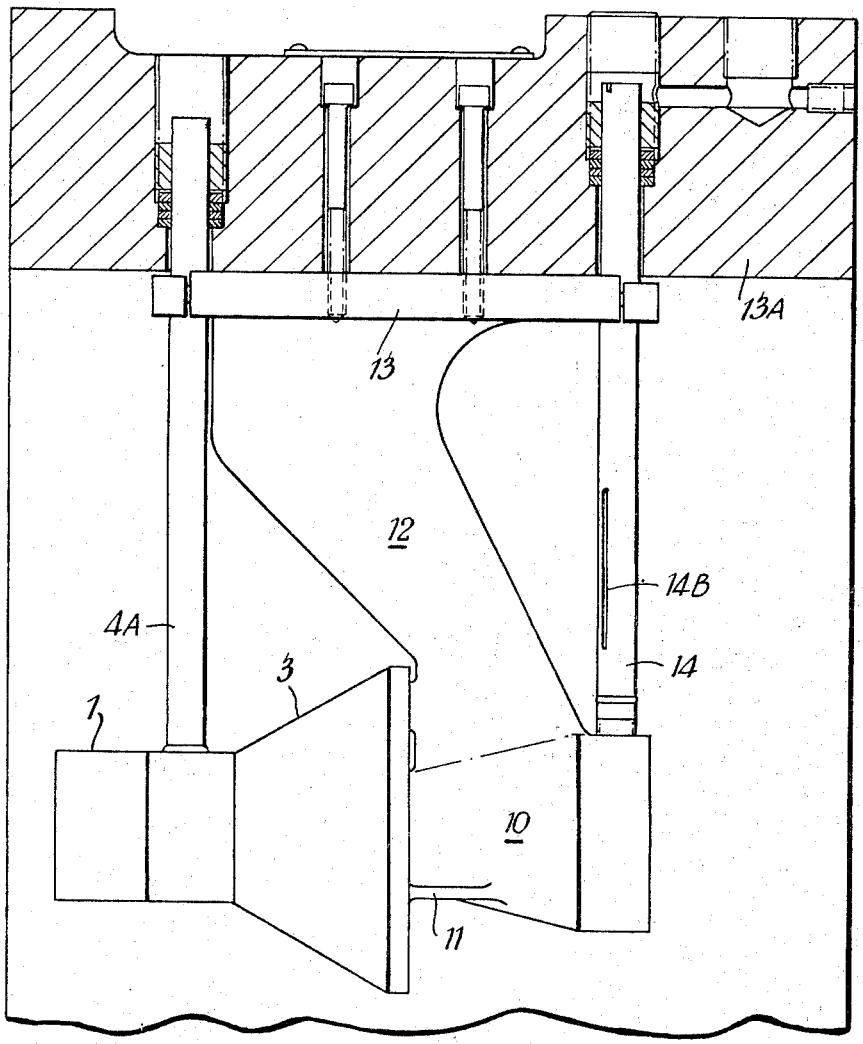
FIGURE 2 is a partly-sectional view showing the means in elevation and part of the duct in section.

FIGURES 3, 3A and 3B schematically illustrate an alternative form of the means, which lends itself to automatic achievement of a linear or other selected response if so required, and are respectively diagrammatic views in plan, side elevation, and end elevation looking upstream;

FIGURE 4 is a sectional view of the total head connection shown in FIGURES 1 and 2 or 3.

In the means shown in the example, an upstream body comprises an externally cylindrical part 1 which may be screwed or otherwise attached to part 3 which has a frusto-conical external shape. The parts 1 and 3 are formed so that a throat annulus gap is provided at 4, from which the low-pressure connection 4A is led to communicate the throat pressure to a manometric device. The gap 4 is bounded upstream by the edge or lip 5, which defines the downstream limit of a convergent passage formed by the frustoconical internal wall 7 of part 1, and which defines the minimum throat diameter. The complementary lip 6 forming the downstream boundary of gap 4 and entry of the frusto-conical diffuser walls, is of greater diameter than that of the edge 5, and is desirably, continued by a cylindrical length of passage 6A as illustrated.

By interchanging part 1 with a similar part having a different angle of convergence, the dimensional relationship of the diameter of 5 to this angle, can readily be achieved if required.

The downstream-facing end of the part 3, indicated at 9 is an annular, generally flat face, in a plane normal to the axis of the device as a whole (that is to say, normal to the general direction of fluid flow). This face 9 has in it an annular groove at 9A into which fits and is secured a complementary ring formed as will be described.

The downstream body is indicated at 10. It is of frustoconical general external shape and is connected by struts as at 11 to the part 3. Its nose extends into the divergent passage formed by the internal wall 8. The dimensions and arrangements are such that if the body 10 continued as a pointed cone its apex would lie in the plane of the throat, as can be seen by imagining its boundary lines 10A to be continued to convergence.

The angles and dimensions of the diffuser section of the tube passage formed by walls 8 and 10A are such that the diffuser passage which is annular and uniform in cross-section, is within critical diffusion limits so that all desired pressure recovery is achieved. It will be noted that the downstream part 8' of the diffuser has a wider divergence angle than the main length leading from the throat 6A.

The downstream end of body 10 may be made flat and for constructional convenience hollow as shown in FIG- URE 1, to house a nut attachment to secure the upstream part.

The downstream part comprises a circular-sectioned boss part 10B (containing the hollow above mentioned) of which the external shape is a continuation of the wall 10A. The boss 10B is integral with a strut or mast 12 which is of streamline section and which is attached to or integrated with a section of the wall of the duct in which the device is installed, indicated at 13. The element comprised by the boss 10B and mast 12, is formed with an annular ring 12A which fits in and is secured, as by studs 12B, in the groove 9A. Thus the mast 12 in effect supports the whole assembly in the duct.

The throat pressure is, as above stated, transmitted by a pipe 4A; this extends from the upstream body part 1 to (and through) a fitting just within the wall 13A of the duct, indicated by 13. This pressure is required to be differentiated from the total head pressure in the measured flow. The total head pressure is sensed and transmitted as follows. A rodlike element 14 extends radially across the duct, between the duct wall 13A and the boss 10B, in both of which it is rotatably supported, as at 14A in boss 10B. Whilst the inner end of the element 14 is circular in section and solid, there is a median portion, corresponding to the length of a slot shown at 14B which opens inwardly into a bore 14C in the outer part of the element 14 (which therefore is in part a pipe) and thus, forming a total pressure-head, can sense total fluid pressure which is communicated by the bore 14C to the manometric device which indicates the difference between the total head pressure and the throat pressure. The median (slotted) portion is, as seen in FIGURE 4, of generally segmental cross-sectional shape the slot being in its narrow or leading edge. The element 14 is adjustable about its length (which is radial in the duct) and by appropriate adjustment a position can be found such that the metering characteristic of the means as a whole can be matched with a required standard, for example an indicator scale marked in terms of rate of flow. This adjustment, then, is achieved by the slot 14B facing exactly upstream (corresponding to fluid flow at normal incidence and maximum dynamic pressure) or offset to some angle other than the normal by rotating and then locking the element 14, in which event the measured pressure head will be the arithmetical sum of the ambient static pressure and dynamic. A further adjustment device is indicated in broken line in FIGURE 1. In this, an annular orifice-plate 15 is attached to the downstream face of the body part 3 and extends across the fluid stream, and therefore according to its radial dimension, decreasing the effective cross-sectional duct area. Such an orifice plate is readily interchangeable, and may be employed to calibrate the flowmeter to meet different conditions, e.g., fluid density, expected range over which metering is required, etc.

In FIGURES 3, 3A, 3B the means is not, as in FIGURES 1 and 2, formed as a solid of revolution, but is of a flattened form.

The convergent-divergent tube has its convergent upstream part 30 leading through a throat provided as in FIGURE 1, and thence through a short part 31 which transforms the circular section into a rectangular section of the divergent tube part 32, having opposite flat divergent walls 32A and flat parallel walls 32B. The tube part 32 opens at its downstream end, by a rectangular opening at 33, into the interior of the duct of which a wall is indicated at 34.

The divergent or different tube part 32 is formed in a body 34 which is of any suitable formation, such as solid or coned plastic. The body 34, which has a backswept leading edge at 34A (which may be aerodynamically profiled) extends transversely in the duct, and to each side of a gap 35 flanked by rearward extensions 34B of the body 34, the flanks 34C of which taper convergently and rearwardly as can be seen in FIGURE 3A, and the tapering may continue to a sharp trailing edge if required (although in the illustrated form the trailing margin of the extensions 34B are flat). The throat pressure is transmitted by a pipe as before, and the total head transmission is again by a pipe of the nature shown in FIGURE 1. This form of the means lends itself particularly to being made wholly or mainly of plastic.

It also lends itself to a function of automatic control. For this purpose there may be provided, as shown in dotted line in FIGURE 3A, a valve element 36 in the form of a flat plate mounted pivotally at 36A to the body 34, in the gap 35, in such a way as to be able to swing (on its pivot at 36A) towards and so to obstruct the opening 33, in respect of which the plate therefore acts as a valve controlling the flow through the tube and therefore affecting the throat pressure. The plate extends beyond the pivot 36A so as to project into the fluid stream; an arrow 37 indicates the swinging of the plate. Thus, dynamic pressure exerted by the directed fluid flow tends to close the metering tube. The plate 34 may be urged by a spring (not shown) towards its open position. By suitable design and spring load, this device may provide automatic control such that the response of the meter is linear (or as otherwise selected) whereas in a fixed form (such as that of FIGURE 1) it is quadratic, being a function of the square root of the fluid velocity.

As to construction, it is not necessary to use heavy castings or very robust parts. For example, construction may be of sheet-metal; and as mentioned especially at FIGURE 3, plastics may be satisfactory for most of the structure. Obviously, the materials used will be selected to be compatible with the fluids to be metered be they liquids or gases.

In the water flowmeter example of FIGURE 1, in which the internal diameter of the duct is 12", the cone angle of the wall 7 is 40° The maximum diameter of the part 3 being D, the edge 5 is of 0.15" D, and edge 6 of 0.171" D. Walls 8 and 10A have a cone angle of 30°. The external cone angle of part 3 is 60°. The external diameter D of part 3 is 3.6" for water in a duct of the diameter quoted above. These dimensions are not limiting but have been found by experiment to be in such relationship as to give good results. Variations within limits will affect extreme precision, but may be allowed in circumstances where extreme precision is not required, at least within the limits stated in the appended claims.

Although it is not regarded as being of great significance, it may be mentioned that the device may be located in a duct which itself has a convergent-divergent form so that the device as a whole operates in a region of increased fluid velocity.

If it is desired to measure fluids containing solids in suspension the total head orifice exemplified by the slot 14B can be replaced by one or more pressure tappings in the wall of the duct, as previously mentioned, or otherwise located.

I claim:
1. A device for measuring the flow rate of a fluid stream confined within a conduit by intercepting a minor amount of the flowing fluid stream for controlled flow through the device followed by reentry of the intercepted fluid into the stream, said device comprising in combination,
  a body for disposition within the conduit, said body having an inlet end and an outlet end and a bore therethrough extending in the direction of stream flow, said body having inner wall portions defining
  a constriction in said bore for converting pressure energy of the intercepted fluid into kinetic energy,
  means for measuring the fluid pressure within the region of said constriction,
  said body also having external wall portions between said inlet and outlet ends which wall portions define a region of the body of progressively increasing cross section in the direction from inlet to outlet whereby to increase flow through said bore,
and means for measuring the total head of the stream, a second body having a conical nose portion projecting into said outlet end of the first body to define an annular diffusion chamber therewith.

2. The device according to claim 1 wherein said second body is provided with a conical extension projecting outwardly from the first body to guide reentrant fluid smoothly into the stream.

3. The device according to claim 2 wherein said external wall portions of the first body are defined by a frusto-conical section thereof.

References Cited

UNITED STATES PATENTS

| 790,888 | 5/1905 | Ferris | 73—213 X |
|---|---|---|---|
| 2,240,119 | 4/1941 | Montgomery et al. | 73—213 |

FOREIGN PATENTS

| 479,044 | 9/1927 | Germany. |
|---|---|---|
| 720,527 | 4/1942 | Germany. |
| 970,297 | 9/1958 | Germany. |

RICHARD C. QUEISSER, *Primary Examiner.*

EDWARD D. GILHOOLY, *Assistant Examiner.*